Dec. 31, 1963   K. B. BREDTSCHNEIDER ETAL   3,115,787
MOTOR OR GEAR UNIT ADAPTER
Filed June 9, 1961   2 Sheets-Sheet 2

Inventors.
Kurt B. Bredtschneider, &
Joseph A. Englert.

United States Patent Office 3,115,787
Patented Dec. 31, 1963

3,115,787
MOTOR OR GEAR UNIT ADAPTER
Kurt B. Bredtschneider and Joseph A. Englert, Chicago, Ill., assignors to Crane Co., Chicago, Ill., a corporation of Illinois
Filed June 9, 1961, Ser. No. 115,944
3 Claims. (Cl. 74—432)

This invention relates generally to motor or gear unit adapters for application to manually operated valves, and, more particularly, it is concerned with a convenient method of attachment of such power or gear units readily to the valves already in the field.

At the outset, in order to acquire a better appreciation of the significance of this contribution, it should be understood that it has long been a problem in the field to provide adapters conveniently and economically for attachment of power units, gear units, and the like, to already installed manually operated valves. In making such attachment heretofore, frequently objectionable dismantling, special machining or costly welding in the field has been required and in many cases the lack of proper equipment or the cost and inconvenience in effecting the attachment of the adapter has made such conversion to a power unit drive or reduction gearing virtually prohibitive.

Accordingly, it is one of the more important objects of this invention to provide for an adapter as hereinafter described in which the method of attachment is relatively conveniently and easily accomplished economically, particularly where the adapter is to be applied to valves in which ball bearing yokes are used in the initial assembly by the manufacturer.

The present invention solves former difficulties by providing for the adaptation of manual valves to power or gear unit operation without necessitating removal of the valve from the pipe line or the application of special mounting flanges, and yet with the assurance of proper alignment and mounting of the conversion unit.

The unit of this invention is particularly suitable for such valve operating mechanisms of the general type shown in U.S. patent application Serial No. 61,019, filed October 6, 1960, for Detachable Valve Actuating Means, now Patent No. 3,034,371, issued May 15, 1962, and U.S. Patent No. 2,859,639, granted November 11, 1958, for Manual Valve Adapter.

Specifically, the invention of this application is also concerned with an adapter means especially suitable for use with valves for a wide variety of services and employing what is termed by those skilled in the art as a split yoke design and generally of the type which is shown on page 76 of Crane Co.'s No. 60 Catalog.

It will be appreciated at the outset that in valves using the split yoke construction, convenient means are provided by the oppositely mounted bolts which hold the hub of the split yoke and its depending arms together thereby to provide not only for the journaling of the usual valve yoke sleeve, but also for the attachment of the adapter of this invention. As will hereinafter become more apparent, however, the only requirement for installation of the unit adapter is that the two yoke bolts (or studs) which normally hold the split hub of the yoke together are replaced by longer bolts (or studs) on both sides of the split yoke in order to accommodate the adapter of this invention.

A further object is to provide a conversion unit in which a yoke adapter coupling is provided with holes that are fitted to the bolt diameter and have threaded holes under 90° to the bolt holes. For ease of application, as will be apparent, the dimension from the axis of the bolt holes on the coupling to its upper surface is slightly smaller than the distance from the bolt hole axis in the split yoke to the upper surface of the yoke.

It is a further provision to provide for a construction readily applicable in which the studs or bolts engaging the threaded holes in the coupling and extend through or penetrate a plurality of holes in the lower flange of the adapter whereby to draw the specially formed adapter solidly against the split yoke, while the upper flange of the adapter functions to provide the attachment means whereby to fasten the motor or gear unit to the said yoke.

Other objects and advantages of the construction embodying the invention will become more readily apparent upon proceeding with the description read in light of the accompanying drawings, in which.

Similar reference numerals refer to similar parts throughout the several views.

Figure 1:
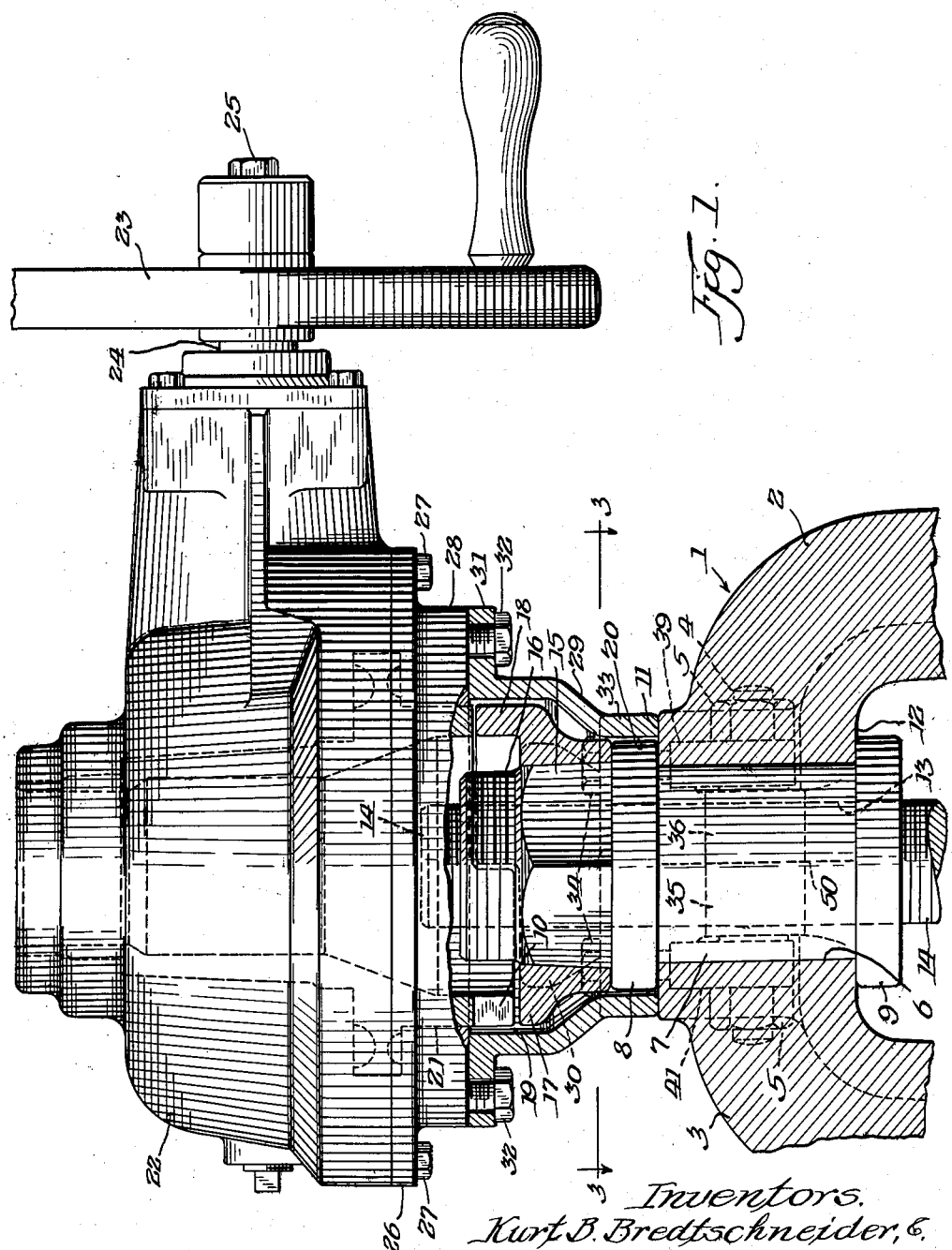
FIG. 1 is a fragmentary sectional assembly view of an adapter element illustrative of our invention.

Referring now to FIG. 1, a divided or split yoke attached to a valve (not shown) and generally referred to as 1 is shown having the oppositely disposed depending yoke arms 2 and 3 joined and held together at their outer hub portion by means of the bolt studs 4 and the nuts 5 located on each side of the yoke hub portion.

The respective yoke arms 2 and 3 at their inner or lower portion are provided with the pads P for effecting attachment to the usual valve bonnet (not shown) by means of the bolt holes 40. In their usual assembly to form assembled split yoke, the arms are drawn together by the yoke studs and nuts 4 and 5 to substantially make contact at 50.

It should be appreciated that the complementary yoke hub portions 2 and 3 are hollow or semi-circular on their interior surfaces as indicated at 6 to receive and journally clamp a rotatable yoke sleeve 7 therewithin as shown. The said sleeve has the upper flange 8 at its outer limits and a lower flange 9 at its inner limits, the flanges bearing against the respective outer surface 11 and the inner surface 12 defining the height or length of the hub. The yoke sleeve 7 is threaded as indicated at 13 to receive like threads of the valve stem 14 so that upon rotation of the yoke sleeve the said stem is moved reciprocally depending upon the direction of rotation of the yoke sleeve and the valve to be opened and closed by means of the closure member (not shown) attached to the lower limit of the valve stem 14.

It should be understood that in normal valve actuation by means of a handwheel, for example, the upper portion of the yoke sleeve is provided with the polygonal portion 15 upon which the handwheel (not shown) is normally fitted in non-rotatable relation to the said yoke sleeve. The threads 16 similarly are ordinarily engageable by a wheel nut (not shown) to hold the handwheel firmly in place on the yoke sleeve.

However, in the instant construction, the said handwheel is removed together with the wheel nut and instead the adapter member 17 is fitted on the yoke sleeve in the same manner as the handwheel would customarily be applied on the polygonal portion 15 in manual operation. It will be noted that the use of the wheel and nut is dispensed with because the member 17 is held in position by inner portions of the unit as hereinafter made clear. At its upper portion, the adapter 17 is provided with the clutch portions 18 to be suitably received within the chamber 19 for engagement with the drive sleeve 21 similarly recessed at 10 annularly whereby to form a castle type of clutch as illustrated in Patent No. 3,034,371 and provide the engaging means to fit in annular spaced relation therebetween to engage said suitably relieved annular abutment 18 defining the outer limits of the adapter 17.

It will be appreciated that the driver housing 22 is provided on its interior with suitable reduction gearing indicated in dotted lines thereby to rotate the drive sleeve 21 and thus impart desired rotative motion to the yoke sleeve 7 through the interposed adapter 17. At an outer end portion thereof and preferably transversely mounted to the valve central axis, the driver housing 22 is provided with a rotatable handwheel 23 which is held on the shaft 24 by means of the wheel nut 25. It will thus be understood that by suitable rotation of the handwheel 23, the shaft 24 through the reduction gearing referred to transmits rotative motion to the sleeve 21. It should further be clear that the handwheel 23 may be replaced, where deemed desirable, by other means providing a mechanical advantage, as power drive means, such as that shown at 31 in Patent No. 2,859,639.

The underportion of gear reduction housing 22 is provided with an attachment plate 26 preferably bolted thereto by cap screws 27. The plate 26 has a depending cylindrical portion 28 which is tapped on its outer periphery to receive the adapter housing member 29. The latter member is flanged at 31 on its corresponding peripheral portion and bolted to the member 26 by means of the cap screws 32 as shown. The housing 29 is open at its inner portion 20 to receive the outer flange 8 of the yoke sleeve 7 and forms the base member upon which the power unit is attached to the valve yoke and supported thereby.

The novel convenient and durable manner of effecting the attachment of the housing member 29 to the split yoke 1 is next to be considered and forms the essence of this invention.

Figure 2:
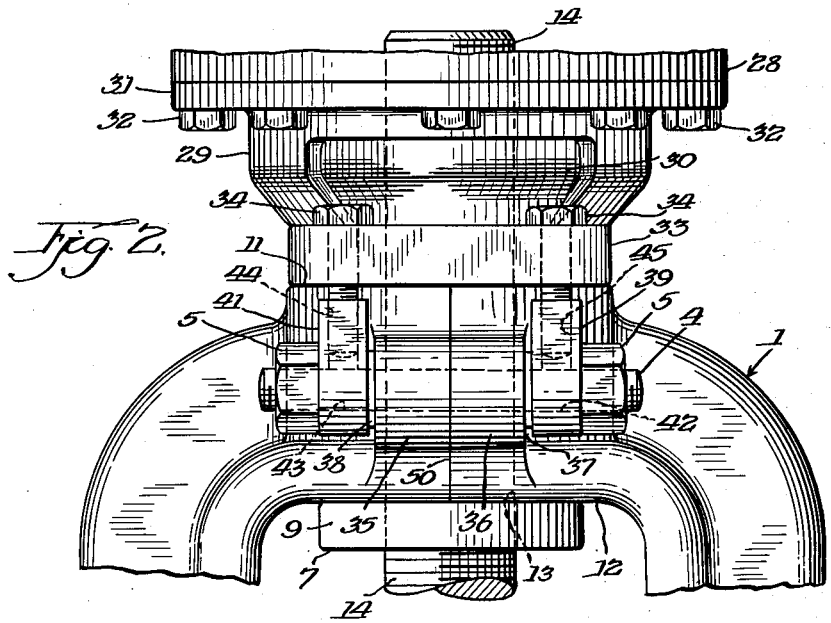
FIG. 2 is a fragmentary front exterior view showing the novel adapter element in position.
Figure 3:
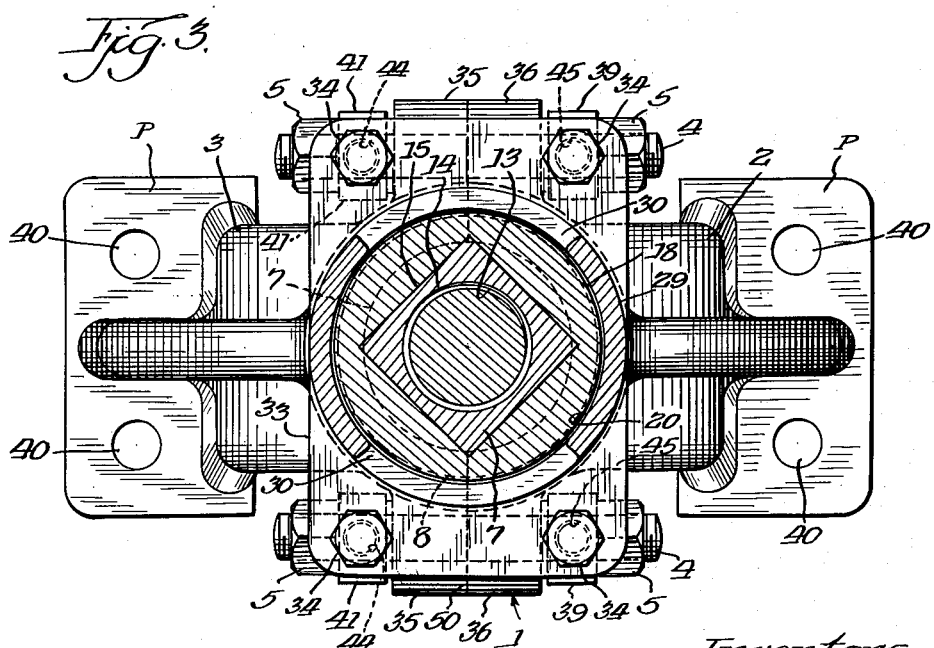
FIG. 3 is a fragmentary sectional assembly view taken on the line 3—3 of FIG. 1.

The housing 29 at its inner portion as shown more clearly in FIG. 2 is provided with an integral flange 33. The latter flange is suitably apertured and carries the bolts 34 for effecting the attachment to the yoke as above described generally. It will be noted that as shown in the plan view of FIG. 3 that the flange 33 is of such configuration that the bolts are suitably located to cooperate with the yoke studs 4 as hereinafter made apparent. As shown in the latter figure, the split yoke 1 has the usual inner abutting apertured ears 35 and 36 used to receive the lengthened bolt studs 4 and normally having the nuts 5 in abutting relation against the surfaces 37 and 38 to hold the split yoke in assembled relation around the yoke sleeve 7 to permit the journaled rotation of said sleeve in effecting the reciprocating movement of the valve stem 14 in opening or closing the valve. As previously stated, in this case, the usual bolt studs 4 are removed and replaced by the longer studs and thus receive the tapped coupling members 39 and 41 of substantially eyelet form. The latter elements are apertured at 42 and 43 to slidably fit upon the bolt studs 4 as shown in FIG. 2 and are interposed snugly between the yoke substantially abutting ears 35 and 36 and the end disposed nuts 5. It will be noted that the outer portions of each of the eyelet members 39 and 41 are provided with radially arranged integral projections which are internally threaded at 44 and 45 to receive the upwardly extending bolt-studs 34. Thus, by drawing down upon the said studs to threadedly engage the tapped portions 45 and 44 and the eyelet formed coupling members 39 and 41, respectively, the flange 33 is firmly attached and drawn against the upper surface 11 of the assembled split yoke 1. The member 29, for purpose of inspection and adjustment of the rotating stem or for lubrication, is preferably ported in end disposed wall portions as indicated at 30.

It will be apparent that where is becomes desirous of installing a valve in the field with a gear reducing unit or a motor operator, it is relatively a simple operation in that it is only necessary to partially disassemble the split yoke. It is, of course, assumed that the original handwheel and wheel nut have been removed, the handwheel being replaced by the adapter clutch member 17. The original short bolts are replaced by the longer transversely extending bolt studs 4 of such length to accommodate the eyelet coupling elements 39 and 41, slidably mounting upon and attaching said elements to said longer studs, the said coupling elements being applied on the stud portions outside of the hub portions 35 and 36. Upon such assembly being completed, the housing unit 22 together with its adapter housing 29 is then positioned on the flange 31. The nuts 34 are next firmly drawn up to apply the inner flange 33 of the housing member 29 in fixed position against the surface 11 of the split yoke.

Thus, a quick and comparatively simple installation has been made whereby to render easy operation of the valve with a power unit or gear reduction assembly, the valve being conveniently converted in a simple manner with a minimum of skill and without the requirement of any special tools other than wrenches to draw up the bolts after removing the handwheel and applying the adapter 29 in the way hereinabove described. It will be further apparent also that it is only necessary to install the portable unit encompassed by the housing 22 upon the valve selected for the conversion, engaging the tapped eyelet couplings 39 and 41 mounted upon the yoke bolt studs 4. It is then a simple matter to draw the adapter housing member 29 securely against the top of the split yoke. The stud nuts 34 are then pulled up against the flange 33 to complete the installation of the unit and render the valve ready for effective operation.

It will, of course, be appreciated that while only a single embodiment has been shown and described, this is solely for purpose of illustration and the scope of the invention should therefore be measured by the scope of the appended claims.

We claim:
1. Adapter connection means to a gear operator for a valve having a split yoke and a non-rotatable rising stem comprising:
　a rotatable yoke sleeve cooperating with the stem;
　a yoke sleeve adapter member mounted over the stem on the said yoke sleeve and revolvable about the stem central axis;
　a valve yoke member comprising a pair of separable yoke arms having hollow complementary yoke hub portions in abutting relation forming an aperture when assembled at an upper end portion of the hub to enclose at least an outer peripheral portion of said yoke sleeve member;
　a drive sleeve rotatably mounted above said yoke member having a lower clutch portion engageable by a clutch portion on said yoke sleeve adapter member;
　means for rotating said drive sleeve comprising a driven gear mounted on the said drive sleeve and rotatable therewith;
　an adapter housing for the gear operator mounted on the hub portion of said valve yoke member and enclosing said yoke sleeve adapter member;
　said adapter housing having removable coupling means comprising pivotally mounted eyelet members at an end portion thereof for effecting attachment of said adapter housing to the yoke member at the juncture of the hub portions of said yoke arms; and
　said coupling means including a plurality of both studs for simultaneously drawing said hub portions to- gether and attaching said eyelet members to said yoke hub portions, the said coupling means including cap screws connecting said eyelet members with said adapter housing to complete said attachment of the adapter housing to the said valve yoke member.

2. The subject matter of claim 1, the said bolt studs for drawing said yoke hub portions together being of a length sufficient to retain said eyelet members pivotally thereon and allowing for initial adjustment of the said eyelet members pivotally in connecting said eyelet members with said adapter housing.

3. The subject matter of claim 1, the said adapter housing having a transverse apertured wall portion for inspection and lubrication of the said adapter, yoke sleeve and stem.

References Cited in the file of this patent
UNITED STATES PATENTS

| | | |
|---|---|---|
| 1,156,493 | Rice | Oct. 12, 1915 |
| 2,297,597 | White | Sept. 29, 1942 |
| 2,324,211 | Hodgson et al. | July 13, 1943 |
| 2,638,368 | Weinberg | May 12, 1953 |
| 2,694,320 | Kron | Nov. 16, 1954 |
| 2,859,639 | Bryant | Nov. 11, 1958 |
| 2,948,557 | Howe et al. | Aug. 9, 1960 |
| 3,034,371 | Cantalupo et al. | May 15, 1962 |